United States Patent [19]
Rapp

[11] 3,969,941
[45] July 20, 1976

[54] LEVEL DETECTOR FOR LIQUIDS AND OTHER FLOWABLE MASSES

[75] Inventor: Eugen Rapp, Moordeich, Germany

[73] Assignee: E. Rapp Electronik GmbH, Moordeich, Germany

[22] Filed: Nov. 8, 1973

[21] Appl. No.: 413,788

[52] U.S. Cl. .............................. 73/290 R; 73/295; 73/299; 73/321; 318/482
[51] Int. Cl.² .................. G01F 23/00; G01F 23/10; H02P 8/00
[58] Field of Search ................ 73/70.1, 290 R, 295, 73/299, 308, 321; 318/482, 685

[56] References Cited
UNITED STATES PATENTS

| | | | |
|---|---|---|---|
| 711,521 | 10/1902 | Parmelee | 73/299 |
| 2,619,620 | 11/1952 | Tapp et al. | 73/290 R |
| 2,884,783 | 5/1959 | Spengler et al. | 73/290 R |
| 3,291,934 | 12/1966 | Mealy | 73/308 UX |
| 3,371,533 | 3/1968 | Dumas | 73/295 |
| 3,500,687 | 3/1970 | Smith | 73/295 |
| 3,523,320 | 8/1970 | York | 318/685 X |
| 3,582,752 | 6/1971 | Steinberg | 318/443 X |
| 3,613,456 | 10/1971 | Hopfe et al. | 73/302 X |
| 3,620,085 | 11/1971 | Khoi | 73/302 X |
| 3,660,746 | 5/1972 | Milek | 318/685 X |

FOREIGN PATENTS OR APPLICATIONS

| | | | |
|---|---|---|---|
| 1,194,598 | 6/1965 | Germany | |
| 819,923 | 9/1951 | Germany | 73/290 R |
| 1,498,365 | 2/1965 | Germany | 73/290 R |

OTHER PUBLICATIONS

Bristol's Recording Liquid Level Gauges, Catalog No. 1800, 1928, pp. 6–10, 24, 25.

*Primary Examiner*—Richard C. Queisser
*Assistant Examiner*—John S. Appleman
*Attorney, Agent, or Firm*—Karl F. Ross; Herbert Dubno

[57] ABSTRACT

A level-sensing head is suspended from a capstan above a vessel by means of a flexible link which is wound around the capstan to raise or lower that head upon rotation thereof in one direction or the other. Depending upon the position of the sensing head relative to the level of a liquid or other flowable mass in the vessel, the head causes emission of either of two control signals triggering a pulse generator to step a motor, coupled with the capstan, in a sense tending to maintain that relative level between two narrow limits. The output of the pulse generator is also fed to recording equipment and/or to a digital comparator designed to establish a preselected level which may be modified from time to time by a programmer. The flexible link may serve as an electrical or fluidic transmission channel for control signals originating at the sensing head; with a floating sensing head such control signals can also be generated by a torsion monitor inserted between the motor shaft and the capstan.

14 Claims, 6 Drawing Figures

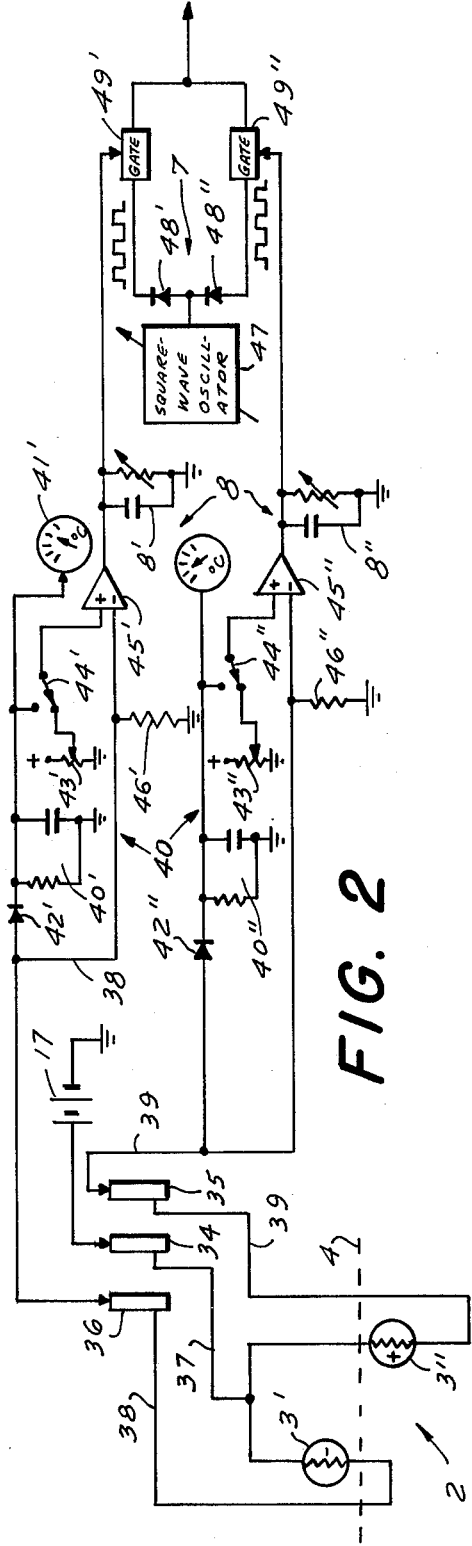
FIG. 2
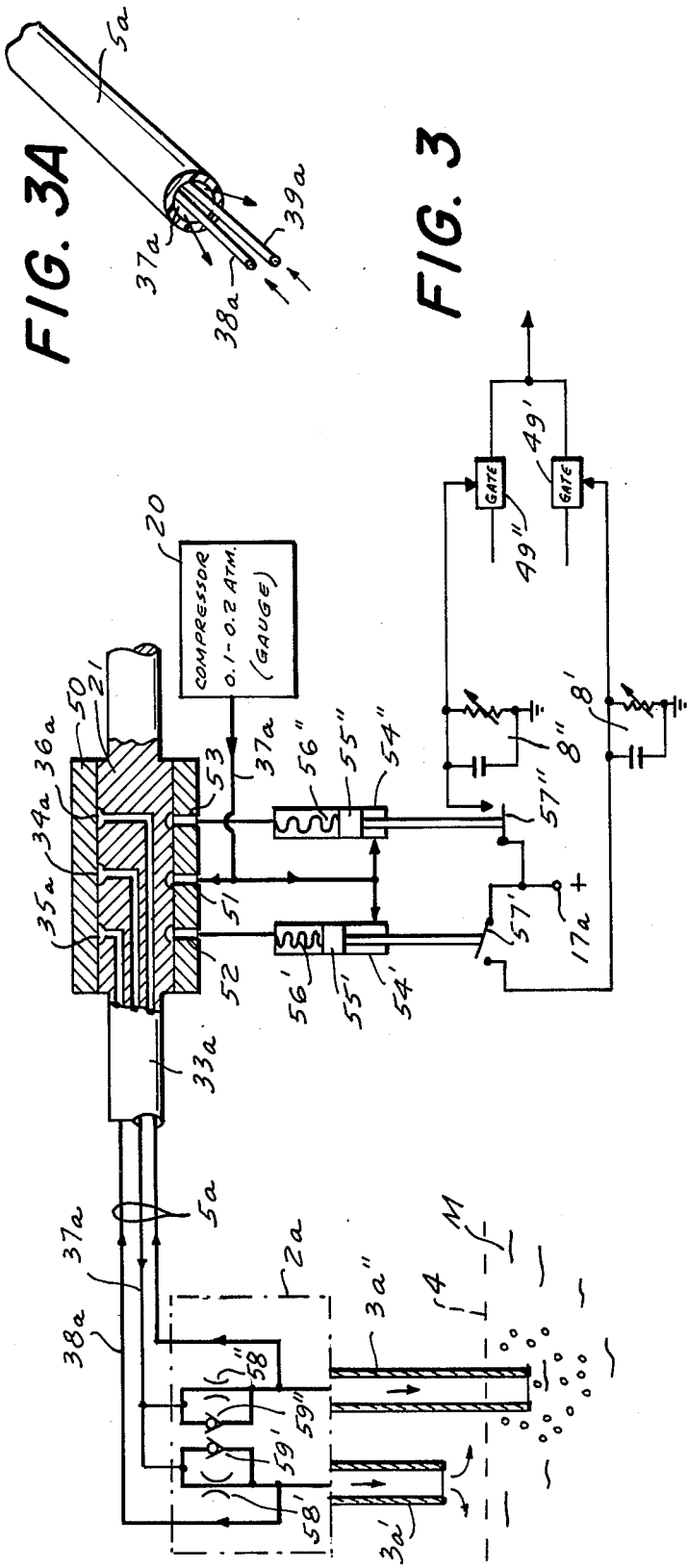
FIG. 3A
FIG. 3

LEVEL DETECTOR FOR LIQUIDS AND OTHER FLOWABLE MASSES

FIELD OF THE INVENTION

My present invention relates to an apparatus for determining and/or adjusting the level of a liquid or other flowable mass (e.g., bulk material such as sugar or grain) in a vessel.

BACKGROUND OF THE INVENTION

Conventional level detectors operate on a variety of principles, e.g., electrically, mechanically or acoustically. In an electric system the level may be measured conductively or capacitively; both methods are limited to masses of particular electric characteristics, and neither of them enables an accurate level determination over a wide range. Mechanical detectors may employ floats swingable about fixed fulcra, in which case the range is again limited and the measured values depend on the specific gravity of the liquid; they could also operate through pressure measurements, such an arrangement requiring the installation of pressure sensors at the bottom of the vessels where access to them is usually difficult. Acoustic level detectors, using ultrasonic devices, likewise have limited accuracy and cannot be readily programmed to preselect a variety of desired levels.

OBJECTS OF THE INVENTION

The general object of my present invention is to provide a level detector which avoids the aforementioned drawbacks of prior-art systems.

A more specific object of my invention is to provide a level detector adapted to operate with high accuracy, e.g., in increments on the order of 0.1 mm, over a wide range which in practice may be as large as 10 to 20 meters.

It is also an object of my invention to provide a level detector having a digital output which can be conveniently utilized for recording and/or programming purposes.

SUMMARY OF THE INVENTION

The foregoing objects are realized, in accordance with my present invention, by the provision of a sensing head suspended by a flexible link from an overhead hoisting mechanism in a vessel containing a flowable mass whose level is to be determined; this head controls a signal generator which emits a first signal whenever the level of that mass relative to the head lies above a predetermined upper limit, a second signal being emitted whenever that relative level lies beneath a predetermined lower limit. The signals so generated are fed to a pulse generator which steps a drive motor for the hoist in a forward direction in the presence of the first signal, thereby raising the sensing head, and in a backward direction in the presence of the second signal, thereby lowering same, whereby the position of the sensing head is adjusted to maintain the relative level of the flowable mass between the two aforementioned limits.

The hoisting mechanism may comprise a capstan about which the flexible link is wound and to which its upper end may be fixed to prevent relative slippage so that the elevation of the head above the bottom of the vessel is positively correlated with the rotary displacement of the capstan from a reference position. If the signal generator is carried by the sensing head itself, the link advantageously serves as a transmission channel for the generated signals. Thus, the link may be a cable carrying electric voltages, or a set of conduits carrying fluid pressures. In each of these cases the pulse generator can be connected to the upper end of that link, by way of the capstan or its shaft, through the intermediary of a suitable coupling such as a set of slip rings or a rotary distributor.

If the system is used to measure the level of a mass significantly differing in temperature from an overlying air volume, thermoelectric sensors such as thermistors may be used. My invention is therefore particularly adapted to detect the level of very hot or very cold liquids such as, for example, liquefied gases (e.g., helium).

An alternative solution, obviating the need for such a coupling, provides for the insertion of the signal generator in the form of a torsion monitor between the driven shaft of the capstan and the drive shaft of its motor, this torsion monitor preferably comprising resilient means such as a coil spring between the two shafts and an optical scanner for ascertaining the relative angular position of these shafts.

The output of the pulse generator, besides stepping the hoist drive, is also fed to monitoring means which can be used to register the position of the head in digital form; naturally, such digital data can be further converted into an analog reading. In particular, the generator pulses may be fed to a reversible counter which thus registers the forward and backward steps taken by the drive motor whereby its count accurately represents the elevation of the sensing head as measured from the bottom of the vessel or from some other reference level. Since, in the steady state of the system, the absolute level of the flowable mass closely corresponds to the elevation of the sensing head, the reading of the pulse counter is an accurate measure of this absolute level. It therefore becomes possible to preset a desired level in a digital selector and to control the filling or draining of the vessel by the output of a comparator connected to the pulse counter and to the selector, the change in mass volume being halted as soon as the comparator detects a match between the two readings. The presetting of the selector may be carried out manually, as required, or under the control of a programmer.

BRIEF DESCRIPTION OF THE DRAWING

The above and other features of my invention will now be described in detail with reference to the accompanying drawing in which:

FIG. 2 is a more detailed circuit diagram of the system of FIG. 1;

FIG. 3 is a generally similar diagram for a pneumatically operated level detector according to my invention;

FIG. 3A shows a detail of the system of FIG. 3 in perspective view;

SPECIFIC DESCRIPTION

Figure 1:
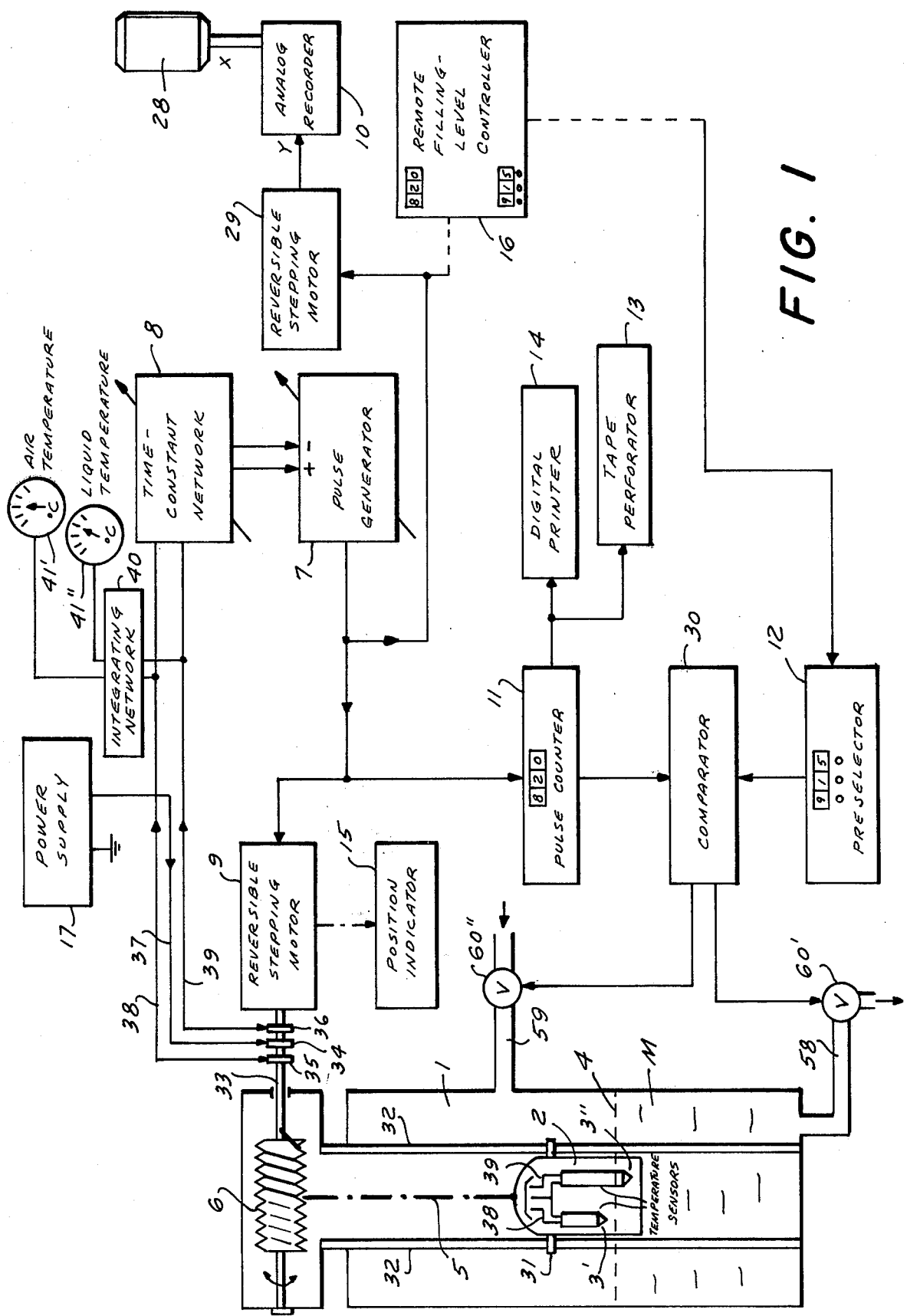
FIG. 1 is a somewhat diagrammatic overall view of an electrically operated level detector embodying my invention.

In FIG. 1 I have shown a system for detecting and adjusting the level of a flowable mass M, here specifically a liquid, held in a vessel 1. This system comprises a sensing head 2 suspended via a flexible link 5 from a capstan 6 forming part of a hoisting mechanism, the link 5 being an electric cable with at least three mutually insulated conductors 37, 38, 39 terminating at a pair of temperature sensors 3', 3'' carried by that head. Sensor 3'' normally extends below the liquid level 4 so as to dip into the mass M which is assumed to have a temperature significantly different from that of the overlying volume of ambient air; sensor 3' normally lies above the level 4 so as to be exposed only to the air temperature. If the relative liquid level rises, i.e., if sensing head 2 is lowered or if additional liquid is admitted into the vessel 1, sensor 3' experiences a change in temperature and emits a first signal to actuate a drive motor 9 for the capstan 6 in a sense causing the head 2 to be lifted until the illustrated relative position of that head and level 4 has been restored. Conversely, a drop in that relative level (due to excessive raising of head 2 or to a partial emptying of vessel 1) alters the temperature acting upon the sensor 3'' which thereupon emits a second signal to operate the motor 9 in the opposite sense whereby the capstan 6 lowers the head 2 to restore the normal relative level. Thus, hoist 6, 9 and head 2 constitute a follower mechanism which always aligns this head with the liquid level 4 within narrow tolerance limits as determined by the difference in the elevation of sensors 3' and 3''.

To stabilize the position of the vertically movable sensing head 2, the latter may be provided with laterally projecting dowels 31 engaging in longitudinal grooves of a pair of vertical guide rails 32 fixedly positioned in vessel 1.

Motor 9 is connected with capstan 6 through a hollow shaft 33 receiving the conductors 37, 38, 39 at the end of cable 5 remote from head 2, this end being peripherally secured to the capstan which is also shown helically grooved. By this means the vertical motion of head 2 is made strictly proportional to the angular displacement of the capstan 6 whereby an incremental rotation of shaft 33 results in an incremental ascent or descent of the sensing head.

The motor 9 is reversibly steppable in predetermined rotational increments by positive or negative pulses applied thereto, under the control of sensors 3' and 3'', from a pulse generator 7; in the absence of such pulses, its shaft 33 is mechanically indexed in the angular position last assumed. As more fully described hereinafter with reference to FIG. 2, intermittent forward and backward rotation of shaft 33 and capstan 6 is brought about by two sets of pulses alternatively emitted by generator 7 in response to respective control signals from sensors 3' and 3'' which are energized from a power supply 17 via their common input lead 37 and whose emitted control signals are fed to the pulse generator over output leads 38, 39 by way of a network 8 of adjustable time constant designed to suppress transient signals due to brief level fluctuations. The sections of leads 37–39 forming part of cable 5 and their extensions beyond capstan 6 are conductively interconnected by respective slip rings 34, 35 and 36 on shaft 33.

Motor 9 is mechanically coupled with a position indicator 15 giving an analog reading of the instantaneous vertical position of sensing head 2 and, therefore, of the absolute level of mass M which closely corresponds to that position. The same information, in digital form, is available from a reversible pulse counter 11 which is stepped by the output of generator 7 in parallel with the motor 9; its count thus rises and falls with the position of sensing head 2. This count, along with the reading of a digital preselector 12, is fed to a comparator 30 having zero output in the event of a match of the two digital data. If the absolute level as given by counter 11 is higher than that preset with the aid of preselector 12, comparator 30 has an output which opens a valve 60' in a drain pipe 58 whereby the vessel 1 is partially emptied until the two readings are equal. Conversely, if the absolute level is lower than the preselected one, comparator 30 has a different output which opens a valve 60'' in feed pipe 59 to supply additional liquid to the vessel until the desired level is reached. Preselector 12 can be operated manually or with the aid of a nonillustrated programmer.

The reading of counter 11 can be recorded in a suitable code (e.g., BCD) on a tape by a perforator 13 and can also be directly registered by a digit printer 14. A second reversible stepping motor 29, driven from pulse generator 7 in parallel with motor 9 and pulse counter 11, acts as a digital/analog converter by displacing a nonillustrated stylus of an analog recorder 10 in one dimension ($y$), a motor 28 serving for the continuous displacement of a recording medium such as a strip of graph paper in another dimension ($x$); thus, the level changes occurring over a period of time can be immediately read in graphic form.

The information available at counter 11 or analog recorder 10 can also be delivered to a remote location by a further output lead of pulse generator 7 extending to a control station 16 which may include duplicates of units 10, 11, 13, 14, 29 or some of them. Station 16 may also be used, as shown, for the remote setting of preselector 12 by hand or under the automatic control of a programmer.

Since sensor 3' is normally surrounded by air whereas sensor 3'' is normally immersed in the liquid M, these two sensors can also be used to furnish data on the temperatures of these media. For this purpose I have shown in FIG. 1 a pair of thermometric devices 41', 41'' which are energized, in a manner more fully described below, from leads 38 and 39 by way of an integrating network 40. This information may be used for manually or automatically readjusting the operating thresholds of pulse generator 7 if the temperature of either fluid is subject to substantial variation over a measuring period.

While the rotational increment per pulse is determined by the design of stepping motor 9, the pulse rate can be readily adjusted by varying the operating frequency of generator 7. Thus, pulse cadences may be selected to provide mean hoisting speeds in a range between, for example, 1 mm/sec and 1000 mm/sec.

I shall now describe, with reference to FIG. 2, details of the hoist drive in a system in which the temperature sensors 3', 3'' are designed as thermistors continuously energized with direct current by the power supply 17 shown here schematically as a battery. In this specific instance, in which it is assumed that the temperature of the flowable mass M is less than that of the ambient air in vessel 1, thermistor 3' has a negative characteristic (i.e., its resistance varies inversely with temperature) whereas thermistor 3'' has a positive characteristic (resistance varying directly with temperature). Integrating network 40 comprises two RC circuits 40', 40'' energized from leads 38 and 39 via respective diodes 42', 42''; time-constant network 8 comprises two RC circuits 8', 8'' in the outputs of a pair of differential amplifiers 45', 45''. Two potentiometers 43', 43'' deliver a pair of reference potentials to noninverting inputs (+) of amplifiers 45' and 45'', respectively, via switches 44', 44'' in their illustrated position enabling manual adjustment of these potentials (e.g., in light of the readings of temperature indicators 41' and 41''); in the alternate switch position these inputs are connected in parallel with meters 41', 41''. Inverting amplifier inputs (−) are connected to leads 38 and 39 to receive measuring voltages developed across respective resistors 46', 46''.

Pulse generator 7 is shown in FIG. 2 as comprising an adjustable square-wave oscillator 47 whose output circuit includes two branches with oppositely poled diodes 48', 48'' and gates 49', 49'' respectively in series therewith. Gate 49' is made conductive by an output from differential amplifier 45' whenever the potential on its inverting input (−) is less than that on its noninverting input (+); similarly, gate 49'' conducts under the control of differential amplifier 45'' whenever its inverting (−) is driven more negative than its noninverting input (+).

As long as the liquid level 4 occupies its normal position relative to sensing head 2, thermistor 3' is at air temperature whereas thermistor 3'' assumes the temperature of the liquid whereby both have relatively low resistances so that relatively high voltage are developed across resistors 46' and 46'', the capacitors of circuits 40' and 40'' being also charged to these voltages. With the switches 44', 44'' in the illustrated "manual" position, the potentials applied to the noninverting inputs (+) of amplifiers 45' and 45'' are lower so that these amplifiers have no outputs and gates 49', 49'' remain closed. When the relative level rises to immerse the thermistor 3' in the cooler liquid, the resistance of this thermistor increases so that the potential on the inverting input (−) of amplifier 45' is reduced and gate 49' is unblocked to give passage to the positive pulse train cleared by half-wave rectifier 48'; these pulses then step the motor 9 to elevate the sensing head 2 and commensurately increase the pulse count in unit 11. A drop in the relative level, on the other hand, exposes the thermistor 3'' to the higher air temperature to raise its resistance, thereby causing conduction of amplifier 45'' and opening of gate 49'' with resultant transmission of the negative pulse train traversing the half-wave rectifier 48''; this leads to a reverse rotation of motor 9 and a corresponding reduction of the pulse count in unit 11.

In the "automatic" position of switches 44' and 44'', the lower voltage values in the operating conditions of thermistors 3' and 3'' are directly compared with the values previously stored in circuits 40', 40'' to unblock one or the other gate 49', 49''.

As will be readily apparent, the characteristics of thermistors 3' and 3'' will have to be interchanged if the liquid temperature exceeds that of the ambient air. Also, with suitable polarity changes in network 40 the two thermistors may have the same (positive or negative) characteristics.

The aforedescribed system is independent of the specific gravity of the liquid to be measured and can therefore be used successively on different liquids in vessel 1, without recalibration. The use of low-loss thermistors enables its utilization with liquids of low ignition point and high-rate gas evolution.

In FIG. 3 I have shown a modified system in which the thermoelectric sensors 3', 3'' have been replaced by a pair of pneumatic sensing tubes 3a', 3a'' carried on a vertically movable head 2a whose suspension from a capstan (not shown in this Figure is similar to that of head 2 in FIGS. 1 and 2, except that the cable 5 has been replaced by a flexible tube 5a forming three conduits 37a, 38a, 39a. As seen in FIG. 3A, supply conduit 37a is constituted by the interior of the tube 5a whereas output conduits 38a and 39a are formed by a pair of narrower tubes disposed therein. The nonillustrated capstan has a tubular drive shaft 33a which forms a continuation of these conduits and is rigid with a rotary distributor 21 surrounded by a cylinder 50. Peripheral annular grooves 34a, 35a, 36a of distributor 21 are the fluidic equivalent of slip rings 34, 35, 36 and establish communication between conduits 37a, 38a, 39a and respective ports 51, 52, 53 in cylinder 50 leading to the continuations of these conduits. A compressor 20 delivers air at relatively low gauge pressure (e.g., 0.1 to 0.2 atmosphere) to supply conduit 37a and to respective inlets of a pair of pneumatic servomotors 54', 54'' having pistons 55', 55'' biased by springs 56', 56'' toward these inlets; other inlets of servomotors 54' and 54'' are connected to output conduits 38a and 39a which receive the signal pressures generated by pneumatic sensors 3a' and 3a'', respectively. Pistons 55' and 55'' control a pair of normally open switches 57', 57'' which in their closed positions transmit the potential of a supply terminal 17a via time-constant networks 8', 8'' to gates 49' and 49'' for respectively opening same.

Supply conduit 37a feeds air to the sensing tubes 3a', 3a'' through a pair of throttle valves 58', 58'' which are shunted by respective check valves 59', 59''. When the bottom of a sensing tube lies above the liquid level 4, as illustrated for the sensor 3a', the air escapes directly into the atmosphere and the back pressure at the tube inlet, communicated to the associated output conduits 38a, is insufficient to help the biasing spring 56' of its servomotor repress the corresponding piston 55' against the counteracting supply pressure. With the tube bottom immersed in the liquid, however, as illustrated for the sensor 3a'', that back pressure is substantially higher so that the corresponding piston 55'' is advanced.

Thus, with the liquid level 4 in its normal position relative to head 2a, piston 55' is retracted and piston 55'' is depressed, the respective control switches 57' and 57'' being thereby held open. A rise in relative level increases the back pressure in conduit 58', acting as a sensing signal, and causes closure of switch 57' so that gate 49' conducts and gives passage to the positive stepping pulses from oscillator 47 (FIG. 2). A lowering of that relative level reduces the back pressure in conduit 58'' and causes closure of switch 57'' to unblock the gate 49''', thereby passing the negative stepping pulses from the oscillator.

Figure 4:
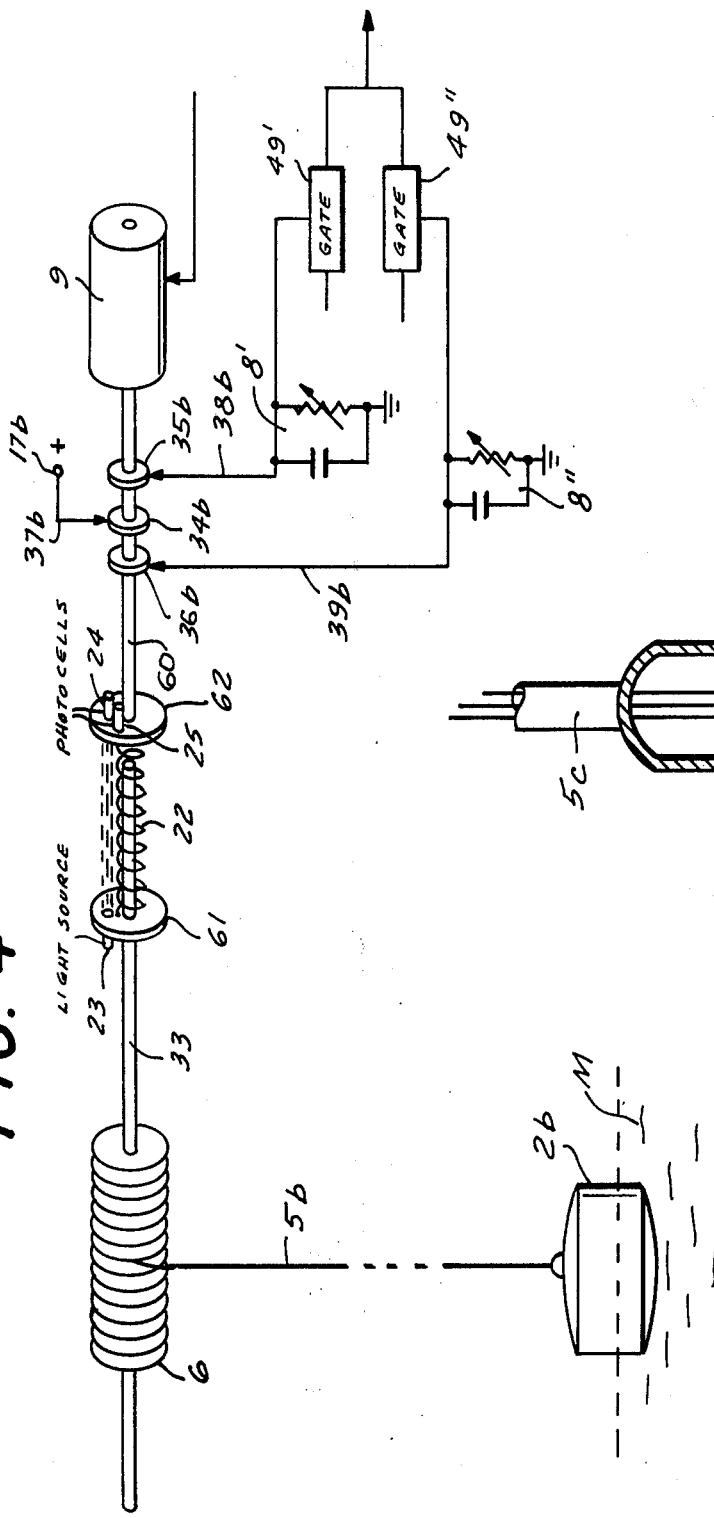
FIG. 4 is a view generally similar to FIG. 1, illustrating an embodiment provided with a torsion monitor.

FIG. 4 represents another embodiment of my invention in which a sensing head 2b, designed as a float, is suspended by a wire, thread or other flexible link 5b from capstan 6. Shaft 33 of capstan 6 is here axially separated from an aligned shaft 60 of stepping motor 9, the two shafts carrying a pair of coaxial disks 61, 62 interconnected by a coil spring 22 forming part of a torsion monitor. Disk 61 carries a source 23 of a sharply focused light beam (such as a lamp and a lens) which may be battery-operated or can be energized from a supply terminal 17b through a nonillustrated flexible conductor. Disk 62 supports two peripherally offset photocells 24, 25 receiving the beam of source 23 in two relative angular positions of shafts 33 and 60. Photocells 24 and 25 are energized in parallel, from supply terminal 17b, by way of a conductor 37b and a slip ring 34b on shaft 60; their outputs are respectively fed to gates 49' and 49" via respective conductors 39b, slip rings 35b, 36b on shaft 60, time-constant networks 8', 8" and possibly a pair of amplifiers not shown.

When the weight of the partly submerged sensing head 2b balances the torque of spring 22 in a position in which the light from source 23 falls between the photocells 24 and 25, motor 9 is arrested and the system is in its state of equilibrium. When the liquid level rises or falls, float 2b follows suit so that disk 61 rotates with reference to disk 62 until the beam illuminates either the cell 24 or the cell 25. In the first instance, which involves a certain relaxation of spring 22, motor 9 is stepped to turn the shaft 60 in a spring-retensioning sense until the normal relative position of disks 61 and 62 is re-established; in the second instance, with additional stressing of spring 22, the motor is stepped in the opposite sense to relieve the spring tension and to restore the equilibrium position of the shafts. Stops (not shown) may be mounted on shafts 33, 60 to prevent their relative rotation beyond the two limiting positions in which cells 24 and 25 are aligned with light source 23.

The aforedescribed variations in the spring force result in a temporary change of the depth of immersion of the floating body 2b, i.e., in a small but definite shift of the level of the liquid M relative to that body so that the system of FIG. 4 operates in the same basic manner as those of FIGS. 1 – 3. Naturally, the head 2b need not be floatable when detached from the link 5b, it being merely necessary that its buoyancy supplemented by the force of spring 22 keeps it only partly immersed in the liquid.

Figure 5:
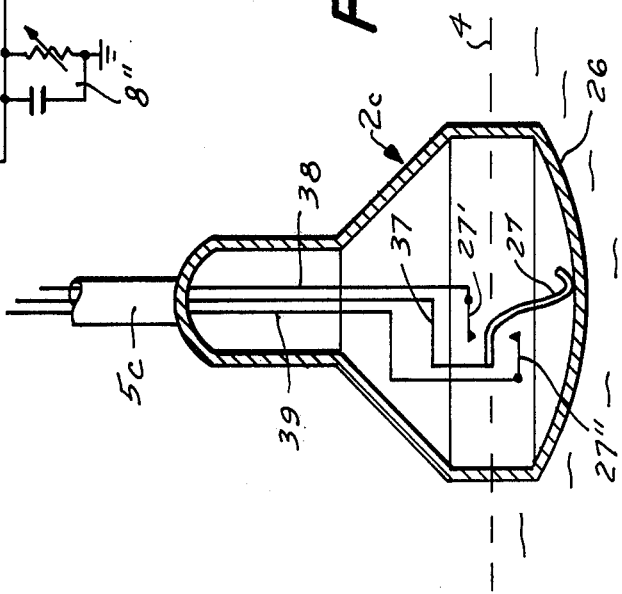
FIG. 5 is a cross-sectional view of a modified sensing head forming part of another electrically operated system according to my invention.

In FIG. 5, finally, I have shown a partly immersed sensing head 2c which is not floatable in its entirety (in the sense just defined) but which carries a floatable element in the form of a downwardly convex membrane 26 bearing upon the flowable mass M. Membrane 26 is biased in a downward direction, relative to head 2c, by the internal air pressure of this head and/or by a contact spring 27 engaging same. Two fixed contacts 27', 27" are separated from the mobile contact 27 as long as the level 4 is in a predetermined position relative to head 2c; contacts 27, 27', 27" are tied to conductors 37, 38, 39, respectively. A rise in relative level increases the upward pressure acting upon membrane 26 to close the contact pair 27, 27' with the resulting unblocking of gate 49' (FIG. 2); a drop in that level closes the contact pair 27, 27" to open the gate 49". Naturally, the temperature indicators 41', 41" and associated circuitry 40 of FIG. 2 are omitted in this instance. The system is particularly effective with flowable masses of high specific gravity, such as bulk material.

If desired, guide means as shown at 32 in FIG. 1 may also be used for the sensing heads of other embodiments.

I claim:

1. A level detector for a flowable mass, comprising:
   a vessel containing a flowable mass whose level is to be determined;
   reversible hoist means above said mass including a flexible link depending into said vessel;
   a sensing head suspended from said link within said vessel;
   signal-generating means controlled by said sensing head for emitting a first signal upon the level of said mass relative to said head lying above a predetermined upper limit and for emitting a second signal upon said relative level lying beneath a predetermined lower limit;
   a reversible stepping motor for driving said hoist means;
   pulse-generating means connected to said signal-generating means for emitting a train of forward-stepping pulses for said stepping motor in the presence of said first signal to raise said sensing head and for emitting a train of backward-stepping pulses for said stepping motor in the presence of said second signal to lower said sensing head whereby the position of said sensing head is adjusted by a predetermined increment per pulse to maintain said relative level between said limits; and
   monitoring means connected to said pulse-generating means in parallel with said stepping motor for determining the current position of said sensing head in response to said forward-stepping and backward-stepping pulses.

2. A level detector as defined in claim 1 wherein said hoist means comprises a capstan, said flexible link being partly wound on said capstan.

3. A level detector as defined in claim 2 wherein said signal-generating means is carried on said sensing head, said flexible link forming a transmission channel for said first and second signals, said pulse-generating means being connected to said flexible link by way of said capstan.

4. A level detector as defined in claim 3 wherein said signal-generating means comprises an electric signal generator, said flexible link being a conductive cable.

5. A level detector as defined in claim 4 wherein said signal generator comprises a pair of temperature sensors disposed at different elevations on said sensing head.

6. A level detector as defined in claim 5 wherein said temperature sensors are thermistors.

7. A level detector as defined in claim 5, further comprising temperature-indicating means for said mass and for the overlying air respectively controlled by said temperature sensors.

8. A level detector as defined in claim 4 wherein said signal generator comprises a downwardly biased floatable element mounted on said sensing head with relative vertical mobility, and switch means controlled by said element.

9. A level detector as defined in claim 4, further comprising integrating circuitry inserted between said signal generator and said pulse-generating means.

10. A level detector as defined in claim 3 wherein said signal-generating means comprises a pair of downwarly open pressure tubes, said flexible link forming a supply conduit for the delivery of pressure fluid to said tubes and a pair of signal conduits for transmitting respective back pressures of said tubes.

11. A level detector as defined in claim 2 wherein said signal-generating means comprises a torsion monitor inserted between said capstan and said stepping motor.

12. A level detector as defined in claim 11 wherein said torsion monitor comprises a first shaft driven by said stepping motor, and second shaft rigid with said capstan, resilient means interconnecting said shafts, and optical scanning means for ascertaining the relative angular position of said shafts.

13. A level detector as defined in claim 1 wherein said monitoring means comprises a servomotor and recording means controlled by said servomotor.

14. A level detector as defined in claim 1, wherein said monitoring means comprises a reversible pulse counter giving a numerical reading of the absolute level of said mass.

* * * * *